United States Patent [19]

Bray

[11] Patent Number: 4,927,483

[45] Date of Patent: May 22, 1990

[54] METHOD OF MANUFACTURING A NAIL FILE

[76] Inventor: David Bray, 2198 Corsair Road, Mississauga, Ontario, Canada, L5A 2L8

[21] Appl. No.: 272,713

[22] Filed: Nov. 17, 1988

Related U.S. Application Data

[62] Division of Ser. No. 918,511, Oct. 14, 1986, Pat. No. 4,785,835.

[30] Foreign Application Priority Data

Nov. 8, 1985 [CA] Canada ................................ 494963

[51] Int. Cl.$^5$ .............................................. B32B 31/14
[52] U.S. Cl. ................................. 156/306.6; 156/313; 156/321; 156/322; 156/324; 156/324.4; 132/76.4

[58] Field of Search ............ 156/153, 154, 229, 306.6, 156/313, 321, 322, 324, 324.4; 132/76.4

[56] References Cited

U.S. PATENT DOCUMENTS

| | | | |
|---|---|---|---|
| 2,308,624 | 1/1943 | Pouech | 132/76.4 |
| 2,382,169 | 8/1945 | Pena | 156/154 |
| 2,838,057 | 6/1958 | Smith | 132/76.4 |
| 3,318,318 | 5/1967 | Gewirz | 132/76.4 |
| 3,527,667 | 9/1970 | Larsen et al. | 156/324 |
| 3,813,315 | 5/1974 | Valyi | 156/322 |
| 4,735,669 | 4/1988 | Guida et al. | 156/324 |

*Primary Examiner*—Caleb Weston
*Attorney, Agent, or Firm*—Anthony J. Casella; Gerald E. Hespos

[57] ABSTRACT

A nail file comprises a core of stiff sheet material and a layer of abrasive material laminated to at least one surface of the sheet material.

9 Claims, 1 Drawing Sheet

METHOD OF MANUFACTURING A NAIL FILE

This application is a divisional of U.S. patent application Ser. No. 918,511 filed on Oct. 14, 1986, now Pat. No. 4,785,835.

The present invention relates to the field of manicure and pedicure appliances. In particular, a novel nail file and polisher is described.

There are currently two principle types of nail files or polishers in popular use. There are solid metal (usually steel) files with integral filing surfaces, usually formed by stamping or grinding an abrasive surface onto one or both surfaces of a steel sheet or strip. These files are quite durable, but they are also relatively expensive, especially when a very fine grade of file is required.

The second kind of file currently available is manufactured from cardboard or very thin wood, which is provided with an emery finish. As can be expected, such a product is fairly inexpensive, but not very durable.

The objects of the present invention, therefore, are to provide an inexpensive, durable nail file, and a method of manufacturing same.

In one broad aspect, the present invention relates to a nail file comprising (a) a core of stiff sheet material; and (b) a layer of abrasive material laminated to at least one surface of said sheet material (a).

In another broad aspect the present invention relates to a method of manufacturing a polisher and nail file comprising the steps of (a) providing a stiff sheet or strip of base material; (b) providing at least one source of abrasive substrate, adjacent said base material (a); (c) providing at least one source of heat activated adhesive film adjacent said substrate and said base material, whereby said heat activated adhesive film can be drawn with said substrate into contact with said base material, between said base and said substrate; (d) drawing said substrate and said film into contact with said base as aforesaid, and applying heat, between 300° F. and 500° F., and pressure, to said base, film and substrate, to laminate said substrate to said base and thereby form a laminate (e); and cutting said laminate into nail files.

Preferably, in the method of the present invention said base is aluminum, from 0.4 mm thick to 1.0 mm thick, preferably 0.5 mm thick; said film is from 0.0127 mm to 0.1524 mm, preferably 0.0254 mm thick, containing from 83%–93%, preferably 88% ethylene, from 5% to 15%, preferably 10% acrylic acid, and from 0% to 7%, preferably 2% ethyl vinyl acetate; and said abrasive substrate is waterproof emery cloth or paper.

In drawings which illustrate the present invention by way of example:

Figure 1:
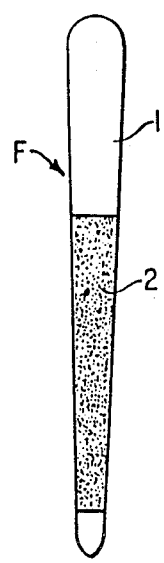
FIG. 1 is a plan view of a nail file according to the present invention.
Figure 2B:
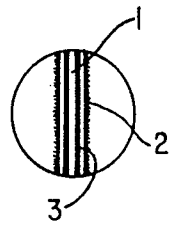
FIG. 2 is a longitudinal sectional view through the embodiment of FIG. 1, with a portion of the view being enlarged to show detail.
Figure 2A:

Referring to FIGS. 1 and 2 together, the nail file of the present invention indicated generally as F, includes an aluminum core 1, shaped as a conventional nail file and a strip of waterproof emery paper or cloth 2 adhesively attached to the aluminum core 1 by means of a heat activated adhesive film 3.

The preferred heat activated adhesive film 3 is a random co-polymer of ethylene and activated adhesive, with a minor vinyl acetate component. Typically, the film will be from 0.0127 mm to 0.1524 mm, (i.e. from 0.5 mil to 6 mil) preferably 0.0254 mm (1 mil) thick, containing from 83%–93%, preferably 88% ethylene, from 5% to 15%, preferably 10% acrylic acid, and from 0% to 7%, preferably 2% ethyl vinyl acetate. Such a film is commercially available as Dow "899", or "709". In a preferred embodiment, aluminum core 1 is about 0.5 mm thick, emery cloth 2 is from 200 to 1200 grade, most preferably 400 grade, and film 3 is 1 ml thick Dow "899" or "709".

Optionally, aluminum core 1 may be pre-treated, for instance by vapour-deposition, with minerals such as nickel, to alter the somewhat dull appearance of aluminum.

Figure 3:
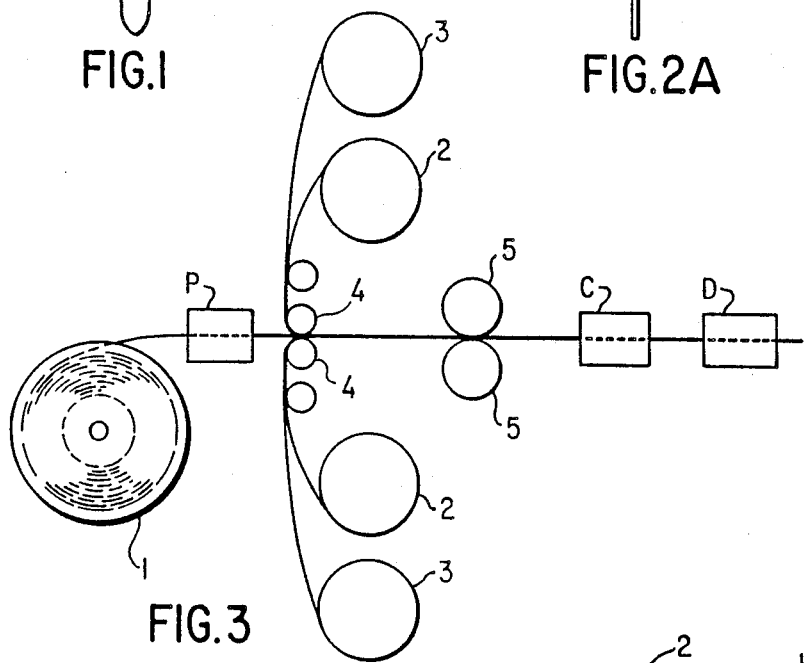
FIG. 3 is a schematic representation of the manufacturing process of the present invention.

In order to manufacture the file of the present invention, the following procedure is carried out (referring to FIG. 3):

(a) a 0.5 mm aluminum base 1 is unrolled off a roll, and into a laminating area;

(b) the aluminum base is then pre-heated, by infrared, flame, or other known pre-heat method (pre-heat area indicated as P);

(c) Dow "899" or "709" adhesive film 3 is unwound from a pair of rolls flanking the aluminum base stock, and downstream of the film rolls, a pair of rolls of waterproof emery paper or cloth 2 is aligned with the film 3 rolls.

(d) by means of secondary rollers 4, the film 3 is brought into contact with each side of the aluminum base stock 1, and the emery 2 is pressed onto the film. The five layer emery-film-aluminum-film-emery combination is then pressed between a pair of heated laminator rolls 5, at a temperature of 300° F. to 500° F.;

(e) the combination then passes through a chiller C, such as an air chiller or chilled rolls, and then to a die-cutter D, where nail files are stamped from the laminate.

Figure 4:
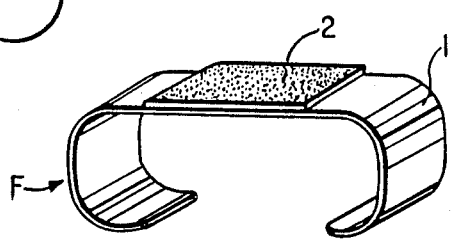
FIG. 4 is a perspective view of an alternative embodiment of the nail file of the present invention.

It will be understood that other metals besides aluminum may be utilized in the present invention. Aluminum is preferred because it is inexpensive, resilient, and capable of holding an attractive finish. Moreover, stiff plastic may be utilized instead of aluminum, (in which case, pre-heating will not be carried out) and a very good product obtained. Also, it can be seen, in FIG. 4, that the nail files of the present invention may be manufactured in shapes other than shown in FIG. 1. Illustrated in FIG. 4 is a shape which lends itself well to use as a manicurists buffer.

It will also be understood that the pre-heating/cooling steps provided in the manufacturing process detailed above are steps of convenience, rather than absolute necessity. By preheating the aluminum substrate, one is permitted to carry out the lamination step more quickly, and at a relatively low temperature. By chilling the product after laminating, one is able to handle immediately the die-cut product without being burned.

I claim:

1. A method of manufacturing a nail polisher and file comprising the steps of:
    (a) providing a stiff sheet or strip of a base material;
    (b) providing at least one source of abrasive substrate, adjacent said base material (a);
    (c) providing at least one source of heat activated adhesive film adjacent said substrate and said base material, whereby said heat activated adhesive film can be drawn with said substrate into contact with said base material, between said base and said substrate;

(d) drawing said substrate and said film into contact with said base as aforesaid, and applying heat, between 300° F. and 500° F., and pressure, to said base, film and substrate, to laminate said substrate to said base, and thereby form a laminate; and (e) cutting said laminate into nail files.

2. A method of manufacturing a nail polisher and file as claimed in claim 1, including the further step of preheating said base material prior to bringing same into contact with said film.

3. A method of manufacturing a nail polisher and file as claimed in claim 2, including the further step of cooling said laminate before cutting it into nail files.

4. A method of manufacturing a nail polisher and file as claimed in claim 3 wherein said base is aluminum, from 0.4 mm thick to 1.0 mm thick.

5. A method of manufacturing a nail polisher and file as claimed in claim 3 wherein said film is from 0.0127 mm to 0.1524 thick, containing from 83%–93% ethylenem, from 5% to 15% acrylic acid, and from 0% to 7% ethyl vinyl acetate.

6. A method of manufacturing a nail polisher and file as claimed in claim 3 wherein said abrasive substrate is waterproof emery cloth or paper, from 200 to 1200 grade.

7. A method of manufacturing a nail polisher and file as claimed in claim 3 wherein said nail files are cut from said laminate by means of a die-cutter.

8. A method of manufacturing a nail polisher and file as claimed in claim 3 wherein said substrate and said film are laminated to each surface of said base, to provide a two-surfaced nail file.

9. A method of manufacturing a nail polisher and file as claimed in claim 3, wherein said base is aluminum, from 0.4 mm thick to 1.0 mm thick; said film is from 0.0127 mm to 0.1524 mm thick, containing from 83%–93% ethylene, from 5% to 15% acrylic acid, and from 0% to 7% ethyl vinyl acetate; and said abrasive substrate is waterproof emery cloth, from 200 to 1200 grade.

* * * * *